United States Patent [19]

Ishihara et al.

[11] Patent Number: 5,229,224
[45] Date of Patent: * Jul. 20, 1993

[54] FUEL CELL GENERATOR

[75] Inventors: Takeshi Ishihara, Toyoake; Keiji Matsuhiro, Nagoya, both of Japan

[73] Assignee: NGK Insulators, Ltd., Japan

[*] Notice: The portion of the term of this patent subsequent to Feb. 23, 2010 has been disclaimed.

[21] Appl. No.: 559,092

[22] Filed: Jul. 30, 1990

[30] Foreign Application Priority Data

Jul. 28, 1989 [JP] Japan ............................ 1-194318

[51] Int. Cl.$^5$ .............................................. H01M 8/10
[52] U.S. Cl. ............................................ 429/34; 429/31; 429/32
[58] Field of Search ......................... 429/31, 32, 34

[56] References Cited

U.S. PATENT DOCUMENTS

| | | | |
|---|---|---|---|
| 3,377,203 | 4/1968 | Mobius et al. | 429/31 |
| 4,395,468 | 7/1983 | Isenberg . | |
| 4,490,444 | 12/1984 | Isenberg . | |
| 4,699,852 | 10/1987 | Yokoyama et al. | 429/31 |
| 4,833,045 | 5/1985 | Pollack et al. | 429/31 |
| 4,895,576 | 1/1990 | Pal et al. | 429/31 |
| 5,009,763 | 4/1991 | Hise | 429/31 |

FOREIGN PATENT DOCUMENTS

| | | | |
|---|---|---|---|
| 0055016 | 6/1982 | European Pat. Off. | 429/31 |
| 1004345 | 9/1965 | United Kingdom . | |
| 1214919 | 12/1970 | United Kingdom . | |

*Primary Examiner*—Asok Pal
*Attorney, Agent, or Firm*—Parkhurst, Wendel & Rossi

[57] ABSTRACT

A fuel cell generator including a tubular solid electrolyte partition having ion conductivity, a fuel electrode provided on the inner peripheral surface or the outer peripheral surface of the tubular solid electrolyte partition, an air electrode provided on the tubular solid electrolyte partition at the opposite side of the fuel electrode, a conductive fuel gas supply tube and a conductive oxidizing gas supply tube, at least one of these tubes being arranged in an inner space of the tubular solid electrolyte partition. Multipoint contact current collectors are made to contact with electrode surfaces of the fuel electrode and the air electrode substantially over the entire surface thereof, respectively and electrically connect between the conductive fuel gas supply tube and the fuel electrode or between the conductive oxidized gas supply tube and the air electrode.

18 Claims, 7 Drawing Sheets

FUEL CELL GENERATOR

BACKGROUND OF THE INVENTION

1. Field of the Invention

The present invention relates to a fuel cell generator.

2. Related Art Statement

A fuel cell generator has recently been remarkably noted as an electricity generator. The fuel cell generator is a system which can directly convert chemical energy of fuel into electric energy, and does not receive a condition of Carnot's cycle, so it has an essentially high energy conversion efficiency, is versatile as to the fuel used (naphtha, natural gas, methanol, coal modified gas, heavy oil and the like), is low in environmental pollution, and its efficiency is not affected by the scale of the electricity generation system, so that the system is an extremely promising technique.

Particularly, a solid electrolyte fuel cell (hereinafter call SOFC for short) is operated at a high temperature of 1000° C., so that an electric reaction is highly active, a noble metal catalyst such as expensive platinum is never required, polarization is small, output voltage is comparatively high, and therefore energy conversion efficiency is remarkably higher than that of other fuel cells. Moreover, since a structural material is all constructed with a solid, the cell has stability and long life.

The SOFC unit consists generally of an air electrode, a solid electrolyte and a fuel electrode. In case of the cylindrical SOFC, a plurality of cylindrical SOFC units are connected in series in such a manner that the fuel electrode of a SOFC unit and the air electrode of an adjacent SOFC unit are connected by means of an interconnector and Ni felt, and also the SOFC units are connected in parallel in such a manner that fuel electrodes of adjacent SOFC units are connected by means of Ni felt.

In the cylindrical SOFC, electrons are received over the whole peripheral surface of the electrode on the interface between the solid electrolyte and the air electrode and on the interface between the solid electrolyte and the fuel electrode. However, the interconnector is only made into contact with the air electrode at one portion, and the Ni felt is made into contact with the fuel electrode at two or three portions for example, so that a generated current flows towards the interconnector and the Ni felt in parallel with the film surface within an air electrode film and a fuel electrode film. However, the air electrode film and the fuel electrode film are thin and have large electrical resistance, so that current loss is large and electricity generating efficiency is lowered. In order to mitigate this electrical resistance and to prevent the voltage loss, it is necessary to make the film thickness thick and to shorten a current passing distance to the interconnector and Ni felt, but a sufficient solution cannot be expected from the limitation in cell structure.

SUMMARY OF THE INVENTION

An object of the invention is to provide a fuel cell generator which can mitigate thermal stress generated, improve characteristics of an advantageous cylindrical structure and simultaneously increase electricity generating efficiency by lessening the internal loss of voltage.

According to the present invention, in a fuel cell generator comprising a plurality of fuel cell units each at least including a tubular solid electrolyte partition having ion conductivity, a fuel electrode provided on the inner peripheral surface or the outer peripheral surface of the tubular solid electrolyte partition, and an air electrode provided on the tubular solid electrolyte partition at the opposite side of the fuel electrode, a conductive fuel gas supply tube, a conductive oxidizing gas supply tube, at least one of these tubes being arranged in an inner space of the tubular solid electrolyte partition, and multipoint contact current collectors are made to contact with electrode surfaces of the fuel electrode and the air electrode substantially over the entire surface, respectively, and electrically connect between the conductive fuel gas supply tube and the fuel electrode or electric connection between the conductive oxidizing gas supply tube and the air electrode is made by the multipoint contact current collectors in the inner space.

According to another aspect of the present invention, in a fuel cell generator comprising a fuel cell at least including a solid electrolyte partition having ion conductivity, a fuel cell provided on one side of the solid electrolyte partition, and an air electrode provided on the other side of the solid electrolyte partition, the fuel cell is formed as a honeycomb structure body, and the fuel electrode or the air electrode is exposed in each of the honeycomb structural body, respective conductive fuel gas supply tubes or conductive oxidizing gas supply tubes are arranged in each of the holes, multipoint contact current collectors are made to contact with electrode surfaces of the fuel electrode or the air electrode exposed in said holes substantially over the entire surface, and electric connection between the conductive fuel gas supply tube and the fuel electrode or electric connection between the conductive oxidizing gas supply tube and the air electrode is made by the multipoint contact current collectors in each of the holes.

The term "tubular solid electrolyte partition" includes both a one end closed tube and a two-end opened tube having a circular or rectangular cylindrical shape. The description "contact over substantially the whole surface" means the case of contacting completely over the whole surface and the case of allowing to leave some non-contact region within a substantially allowable range.

BRIEF DESCRIPTION OF THE DRAWINGS

The present invention will be described in more detail by reference to embodiments in connection with the accompanying drawings, in which.

DETAILED EXPLANATION OF THE PREFERRED EMBODIMENTS

Figure 1:
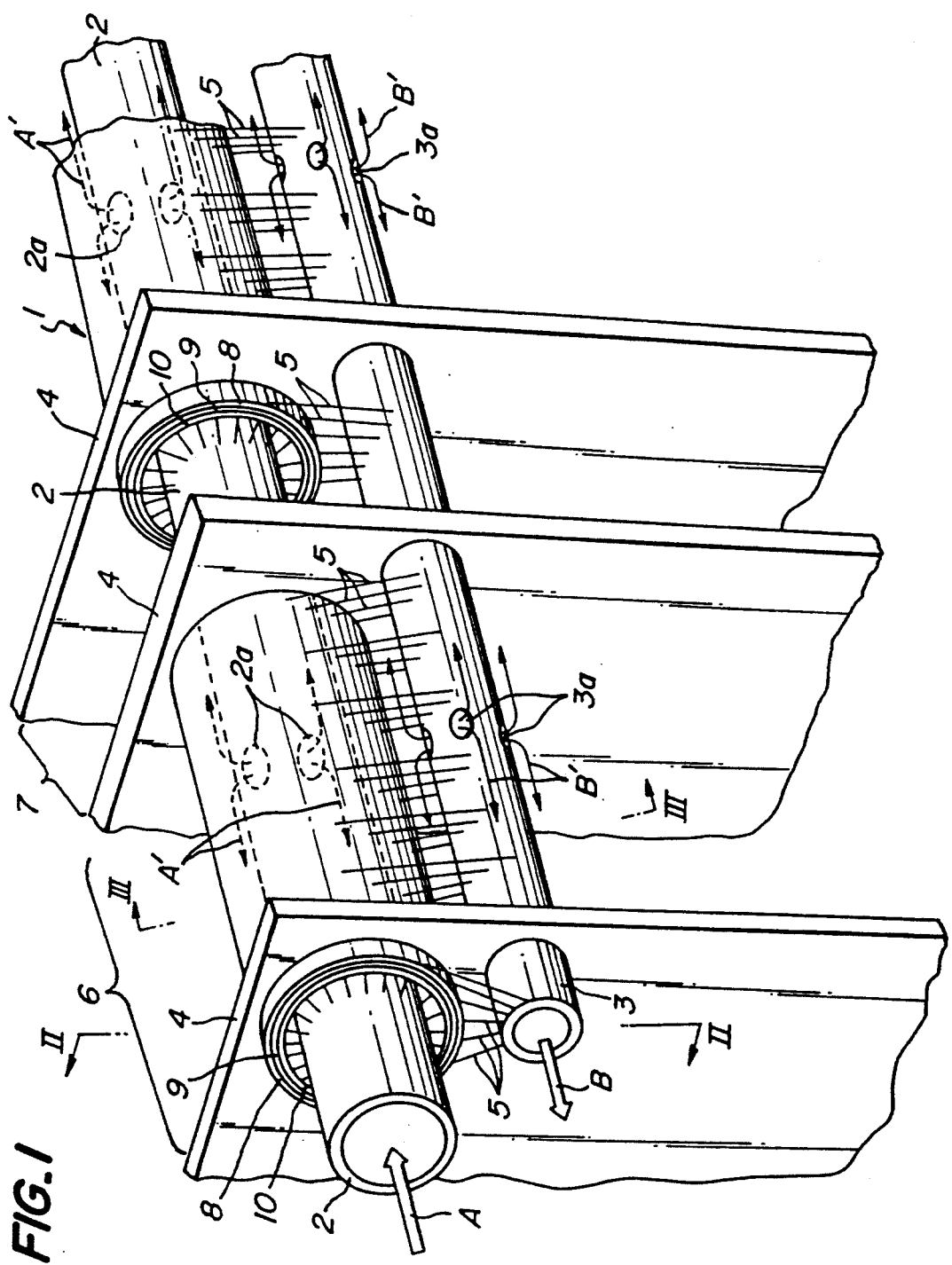
FIG. 1 is a fragmentary schematic perspective view, partly broken, illustrating an embodiment of the fuel cell generator according to the present invention.

The present embodiment explains a fuel cell generator comprising a number of cylindrical SOFC units 1 each having opened opposite ends and being arranged in series and in parallel.

A plurality of porous barriers 4 are fixedly arranged parallely spaced from each other to alternately define power generating chamber 6 and combustion product chamber 7. In the power generating chamber 6, opposite end portions of the SOFC units 1 are inserted into through-holes in the opposed porous barriers 4, respectively to support the SOFC unit 1 by the opposed porous barriers 4 in such a manner that the SOFC unit is extended over the power generating chamber 6. The SOFC unit 1 is thus positioned by the porous barriers 4 through a felt 25 (FIG. 1 omits to illustrate the felt 25) under a softly pressed condition. The end opening of the SOF unit 1 is opened toward the combustion product chamber 7, and opposed to the end opening of adjacent SOFC unit 1.

The SOFC unit 1 has such a construction that an air electrode film 10 is provided on the inner peripheral surface of a cylindrical solid electrolyte partition film 9 and a fuel electrode film 8 is provided on the outer peripheral surface of the partition film. The air electrode film 8 can be formed with doped or undoped $LaMnO_3$, $CaMnO_3$, $LaNiO_3$, $LaCrO_3$ and the like, and strontium-added $LaMnO_3$ is preferable. The solid electrolyte partition film can generally be formed of yttria stabilized zirconia and the like. The fuel electrode is generally a nickel-zirconia cermet or cobalt zirconia cermet.

One conductive oxidizing gas supply tube (preferably made of heat resistant metal) 2 is passed through an inner space C of a plurality of cylindrical SOFC units 1. Each cell unit 1 can be held by the conductive oxidizing gas supply tube 2 through air-permeable felts 25 (FIG. 1 omits to illustrate the felt 25). A number of needle-like current collecting brushes 5 are fixed to the outer periphery of the oxidizing gas supply tube 2, and the free ends of needles of the brushes 5 are pressed against the electrode surface of the air electrode 10. The needles of the current collecting brush 5 preferably made of heat resistant metal and has elasticity at high temperature of about 1000° C. The oxidizing gas supply tube 2 is provided with oxidizing gas supply inlets 2a at the central portion located within the power generating room 6.

Moreover, a conductive fuel gas supply tube 3 is passed through a plurality of power generating chambers 6 and combustion product chambers 7, and is provided at the outside of the cylindrical SOFC unit 1 in parallel to the conductive oxidizing gas supply tube. The conductive fuel gas supply tube 3 preferably made of heat resistant metal, and has fuel gas supply inlets 3a opened within the power generating chamber 6. On the surface of the conductive fuel gas supply tube 3 is also fixed with a number of needle-like current collecting brushes 5, and free ends of needles of the brushes 5 are urgedly contacted with the electrode surface of the fuel electrode 8. From the outer periphery of one conductive fuel gas supply tube 3 are extended needle-like current collectors 5 in four directions for example, and four SOFC units 1 are electrically connected to one conductive fuel gas supply tube.

An oxygen-containing gas such as air is supplied to the conductive oxidizing gas supply tube 2 as shown by an arrow "A", and discharged from the oxidizing gas outlets 2a to the inner space C within the cell unit as shown by an arrow "A'", dividing into two directions. Moreover, the oxidizing gas is sent into the adjacent SOFC unit 1 in the same manner.

A fuel gas such as hydrogen, carbon monoxide and the like is forwarded within the conductive fuel gas supply tube 3 as shown by an arrow B, and discharged into the power generating chamber 6 from the fuel gas outlets 3a as shown by an arrow B' dividing into two directions in the same manner as described above.

The porous barrier 4 is designed to produce a slight differential pressure between the power generating chamber 6 and the combustion product chamber 7, to prevent a back flow of combustion products from the combustion product chamber 7. The oxidizing gas diminished after utilization for power generation flows from the opening of the cell unit 1 into the combustion product chamber 7 as shown by an arrow "A'". At the same time, the diminished fuel gas flows into the combustion product chamber 7 through the porous barrier 4 as shown by an arrow "B'", and burns by contacting with the oxidizing gas to therefore preheat the gas passing through the conductive gas supply tubes 2 and 3.

In the power generating chamber 6, the oxidizing gas generates oxygen ions at the interface between the air electrode 10 and the solid electrolyte 9. These oxygen ions move to the fuel electrode 8 through the solid electrolyte 9 and react with fuel to release electrons to the fuel electrode. The release electrons are collected to the conductive fuel gas supply tube 3 through the needle-like current collectors 5.

The fuel cell generator according to the present embodiment can perform the following effects.

(1) Since the needle-like current collectors 5 contact the surfaces of the air electrode and the fuel electrode over substantially the entire surface, it is possible to reduce voltage loss caused by current flowing in the air electrode film and the fuel electrode film of high resistance as in the prior art, and to collect current in a direction perpendicular to the electrode films. Therefore, efficiency of electricity generation is strikingly improved.

Moreover, in the prior art, there has been conventionally provided an interconnector by cutting away a fuel electrode 8 and a solid electrolyte 9 at one portion to collect current from an air electrode through the interconnector in order to collect current from the air electrode 10 faced to the inner space C. Therefore, a distance from the portion for generating electric load to the interconnector is long, and output resistance loss is produced.

On the contrary, according to the present embodiment, the conductive oxidizing gas supply tube 2 is passed through the inner space C and electrically connected to the air electrode 10 through a plurality of needle-like current collectors 5 provided along the length of the air electrode. Therefore, current can be directly collected through the conductive oxidizing gas supply tube, so as to require no interconnector as the prior art. Thus, cell efficiency is improved by utilizing interconnector area.

(2) An Ni felt has hitherto been used as a current collector, but the Ni felt has such problems that it is deformed in use at high temperature to cause contact failure with electrode and efficiency of electricity generation is lowered.

On the contrary, according to the present embodiment, the needle-like current collector is elastic and urgedly contacted with the whole surface of the air electrode and the fuel electrode, so that a contact surface area is large, a load per current collector is small and pressing force is made small. Hence, together with the above elasticity, deformation is lessened, contact failure scarcely occurs, and reduced efficiency of electricity generation is prevented.

(3) As a cylindrical SOFC unit, there has been used a one end closed tube-shaped cell unit having one closed end. On the other hand, in order to increase efficiency of electricity generation, it is necessary to increase a generating area per one by elongating the one end closed tube. However, when the one end closed tubular SOFC unit is made long, a temperature gradient and a current density gradient become large, that is rather troublesome to affect efficiency of electricity generation.

That is, the fuel gas has still a high concentration in the vicinity of a fuel gas inlet portion and then an electrochemical reaction is active to raise the temperature of the electrode. Therefore, the reaction becomes more active by this temperature rise. On the other hand, the fuel gas is substantially decreased at the other end, so that the electrochemical reaction is inactive and the temperature of the electrode is low. Therefore, the reaction becomes more inactive owing to this low temperature. Moreover, the decreased fuel gas contains a considerable amount of $CO_2$ and water vapor and this $CO_2$ and water vapor deposit on the surface of the electrode to prevent the reaction thereby further lowering the temperature. This tendency is more vigorously developed as the one end closed tubular cell unit becomes longer.

On the contrary, according to the present embodiment, the SOFC unit 1 is opened at both ends and a number of cell units are linearly aligned. Accordingly, a length of the SOFC unit 1 can be limited to such a suitable length that a temperature gradient does not become large and a length of the whole system can optionally be changed by arranging appropriate numbers of cell units. Consequently, efficiency of electricity generation can be highly increased by making the length of the whole system longer than the prior one. Moreover, since a length of one SOFC unit can be short, it is possible to minimize a temperature gradient. Furthermore, in the present embodiment, an oxidizing gas outlet and a fuel gas outlet are provided in the region of the center of a power generating chamber, and the gas discharged from these outlets goes forward in two directions, so that a passing distance from the outlets to the combustion product chamber is shortened to half, and as a result, the temperature gradient is more easily controlled.

(4) There has been required high technology to uniformly mold a long tubular cell with ceramic material, so that it has been difficult to mold such a long tubular cell.

In this point, the present embodiment only requires a short length of each cell unit made of ceramics, so that it is possible to avoid such difficulty in manufacture and also increase efficiency of electricity generation. Moreover, when the conductive gas supply tubes 2 and 3 (refer to FIG. 1) are made of heat resistant metal, continuous length tubes can be easily manufactured. It is very advantageous for manufacturing the fuel cell generator.

(5) It is possible to supply a fuel gas or oxidizing gas simultaneously into a number of power generating chambers 6 by simply supplying the fuel gas or oxidizing gas into one conductive gas supply tube 2, 3, and it is not necessary to provide a fuel chamber and an oxidizing gas supply tube by every single power generating chamber as in the prior art.

The above-described embodiment can be modified as follows.

Figure 2:
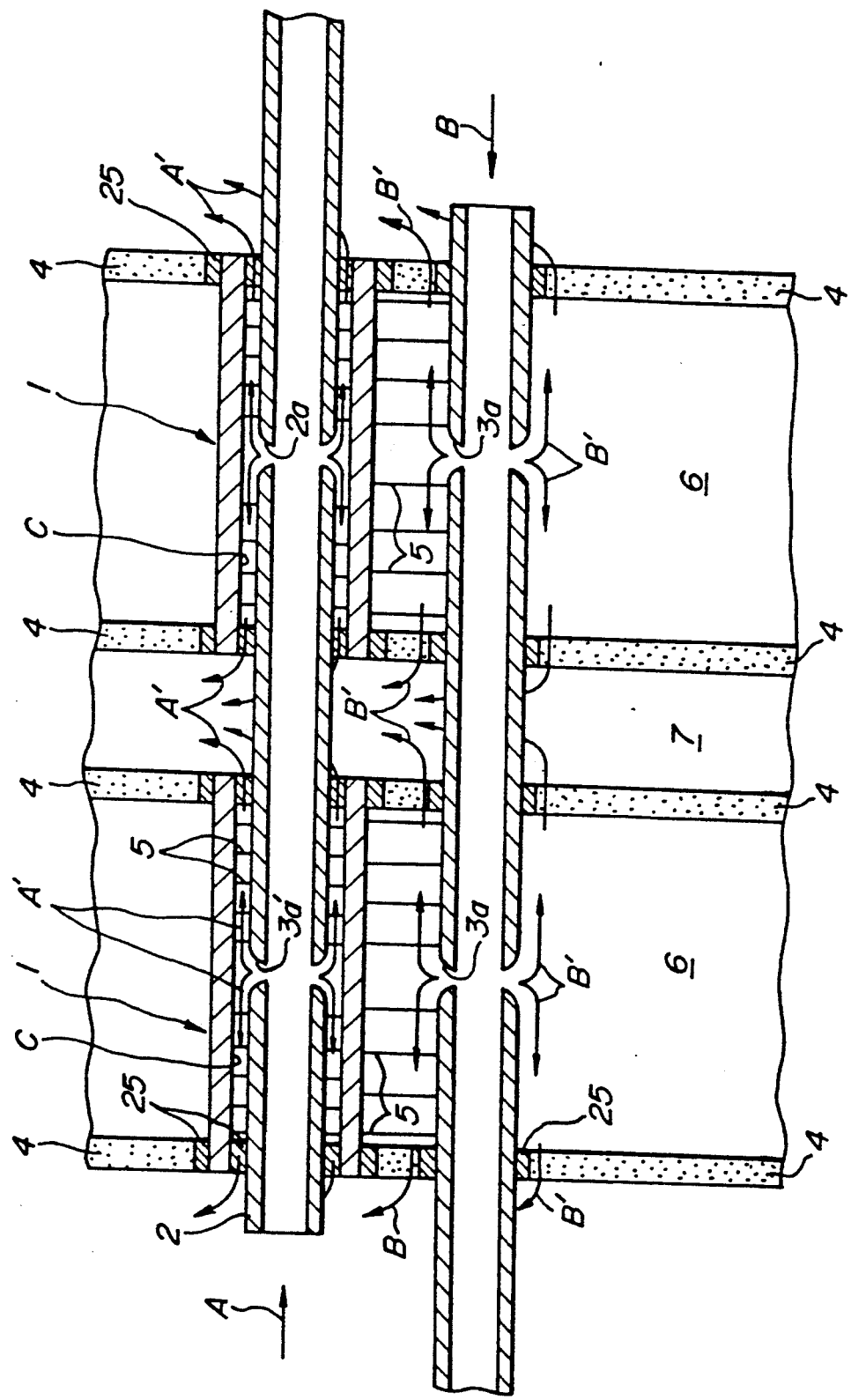
FIG. 2 is a sectional view taken along the line II—II of FIG. 1.

(a) In FIGS. 1-2, the current collector may be a comb-like heat resistant metal electrode, a metal wool like current collector or the like and also other current collectors having low rigidity and elasticity instead of the needle-like current collector 5. Different current collectors can be used on the fuel electrode side and the air electrode side as a matter of course. Moreover, felt-like current collectors such as Ni felt can be used in lieu of the above to provide multipoint contact substantially all over the electrode surface.

(b) The porous barrier 4 is not particularly necessary, and the conductive gas supply tubes 2 and 3 may be fixed to support each SOFC unit 1 by means of the needle-like current collectors 5.

In addition to the porous barrier 4, a supporting or flowing baffle may be accommodated, or a sealed structure is not particularly required.

(c) The embodiment shown in FIG. 1 is arranged such that each cell unit is supported horizontally, but the whole system may be supported vertically at a predetermined angle.

(d) The above embodiment is also arranged such that the cylindrical solid electrolyte partition per se acts as a rigid body to self-support the cell elements, but the cell unit may be formed with use of a porous and conductive substrate tube.

Such porous conductive substrate can be made of Sr-doped $LaMnO_3$.

(e) In FIG. 1, instead of using the conductive fuel gas supply tube 3, a conventional fuel chamber may be provided to supply fuel to the power generating chamber 6. In this case, current collection on the air electrode side is carried out as shown in FIG. 1. Substantially all over the fuel electrode surface of each cell unit is made into contact with multipoint contact current collectors such as a brush of needle-like current collector 5, a comb-like heat resistant metal plate, heat resistant metal wool, heat resistant metal felt and the like, fuel electrodes of each adjacent cell unit may be electrically connected by the multipoint contact collectors, and finally electrically connected to a metal plate to collect currents at the metal plate. In addition, an electrical load is applied between the conductive oxidizing gas supply tube 2 and the metal plate.

(f) The air electrode film may be provide on the outer peripheral surface of the cylindrical solid electrolyte partition 9 and the fuel electrode film may be provided on the inner peripheral surface of the partition. In this case, the fuel gas is supplied to the inner space of a cell unit, and the oxidizing gas is supplied to the outside thereof.

The multipoint contact current collector may be made of any other conductor such as conductive ceramic, ceramic-coated metal and the like rather than heat resistant metal.

Figure 4:
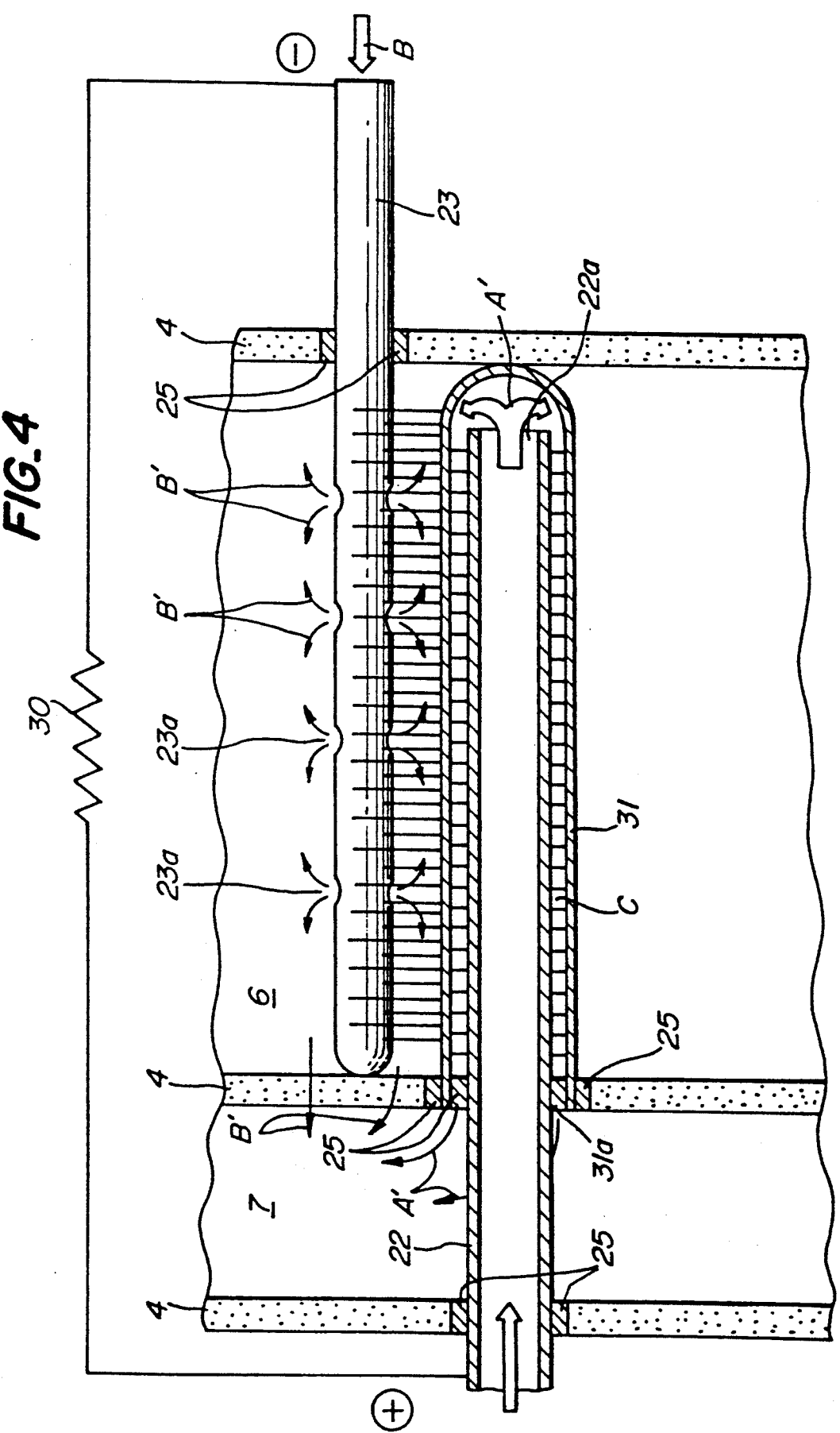
FIG. 4 is a sectional view similar to FIG. 2 showing another embodiment of the fuel cell generator.

FIG. 4 is a cross-sectional view similar to FIG. 2 showing an embodiment of applying the invention to a one end closed tubular SOFC unit 31.

Figure 3:
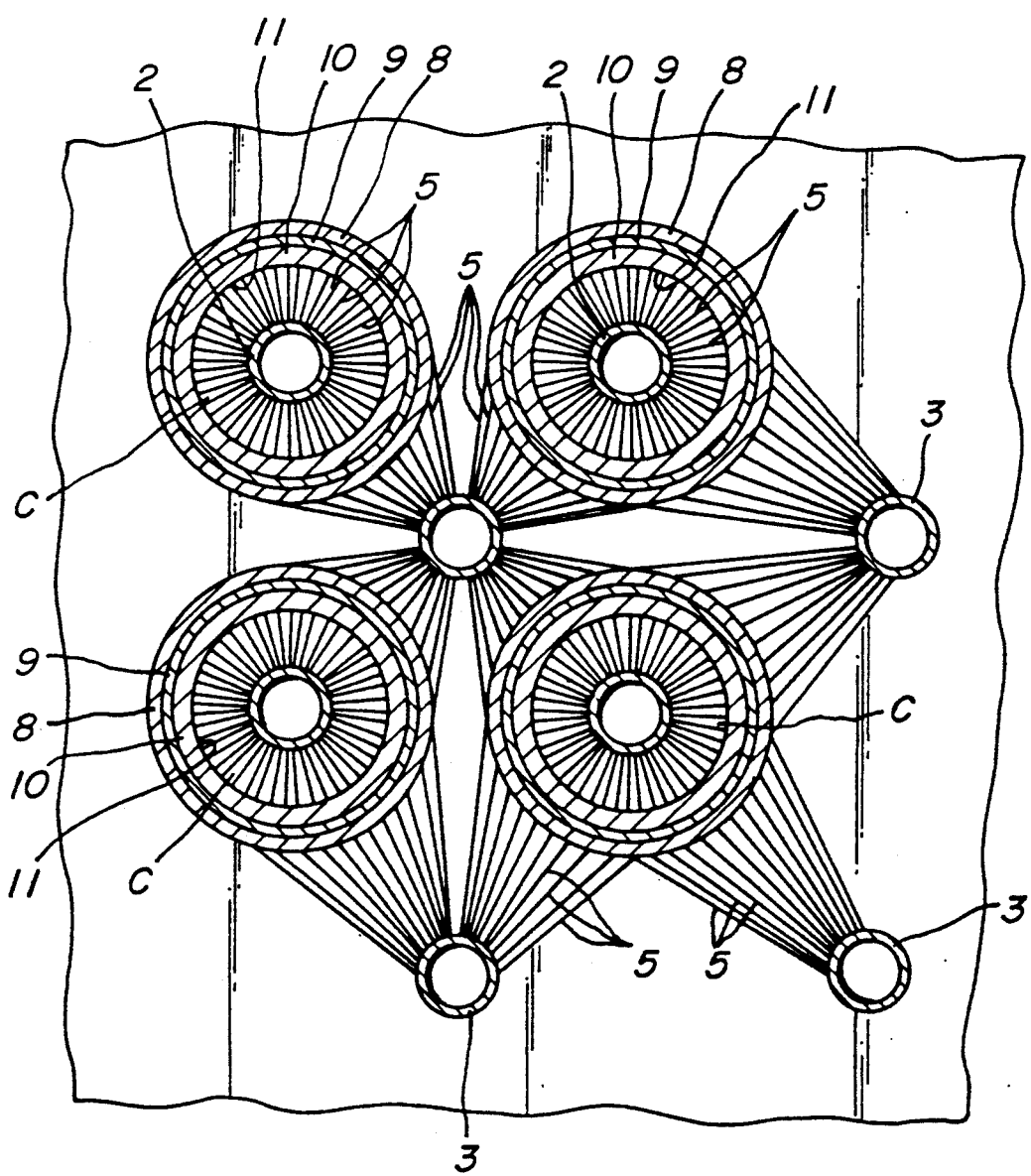
FIG. 3 is a sectional view taken along the line III—III of FIG. 1.

In the same manner as in FIGS. 1-3, the SOFC unit 31 comprises a fuel electrode, a solid electrolyte partition and an air electrode in order from the outside (except that FIG. 4 simplifies a cross section of the SOFC unit 31 as well as FIG. 2).

The fundamental construction of the fuel cell generator of the present embodiment is the same as described above, but the SOFC unit 31 is of a one end closed tube. Accordingly, one SOFC unit 31 is disposed and one conductive oxidizing gas supply tube 22 is inserted from an opening 31a of the cell unit 31 to supply oxidizing gas from the supply tube 22 as shown by an arrow A through the end opening 22a into an inner space C as shown by an arrow A'. An excessive oxidizing gas is discharged in a combustion product chamber 7 through a felt 25 as shown by an arrow A'.

A conductive fuel gas supply tube 23 is also a one end closed tube, and four fuel gas supply ports 23q are provided for example to supply fuel gas from these gas supply ports 23a to a power generating chamber 6 as shown by an arrow B'. The conductive oxidizing gas supply tube 22 and the conductive fuel gas supply tube 23 are connected via an electrical charge 30 to take out power via the electrical load 30.

The other points are the same as the embodiments shown in FIGS. 1-3, and the above effects (1) and (2) can be performed. Moreover, the above modification (a)-(f) are possible.

Figure 5:
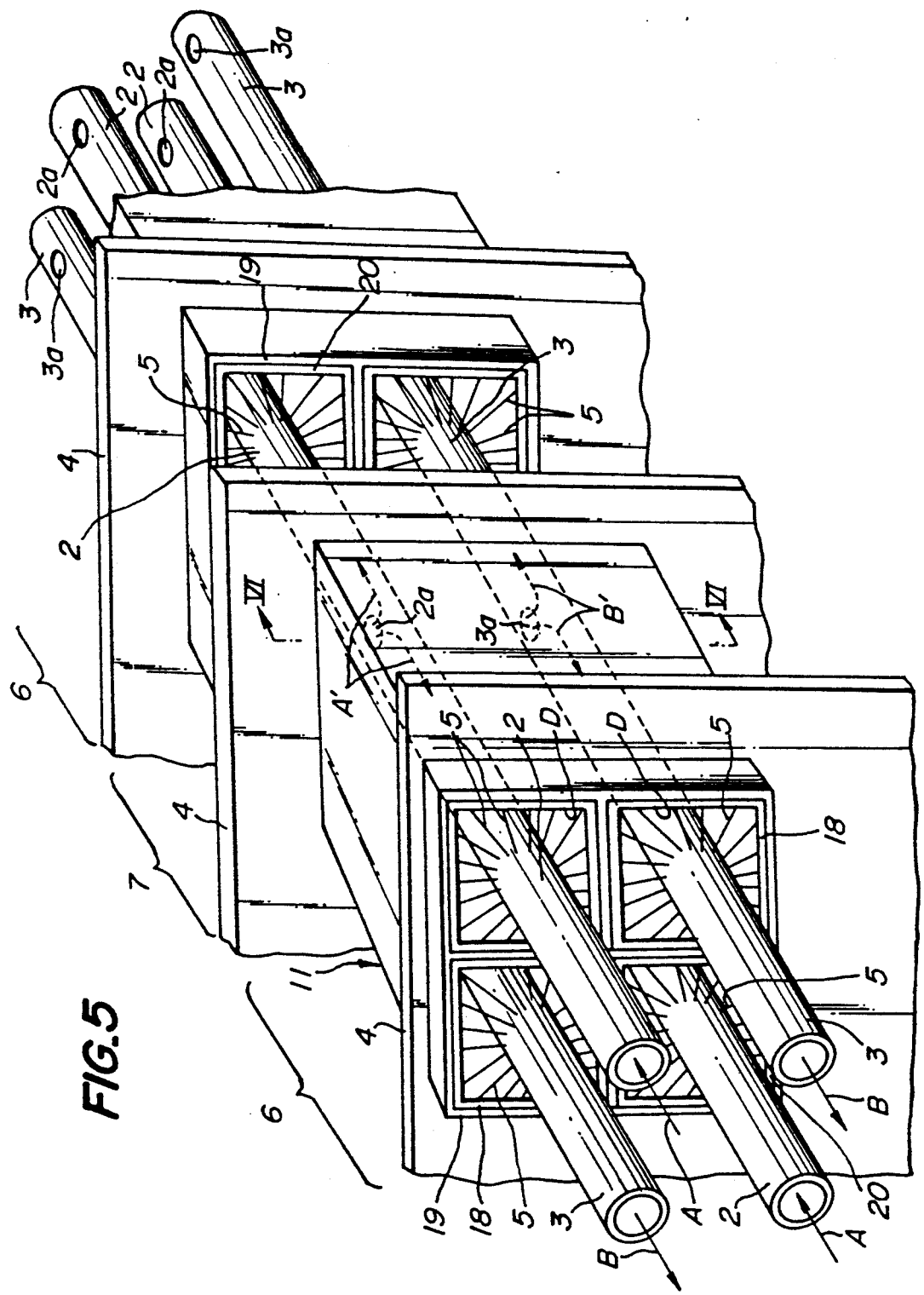
FIG. 5 is a fragmentary schematic perspective view, partly broken, illustrating a further embodiment of the fuel cell generator of the present invention.
Figure 6:
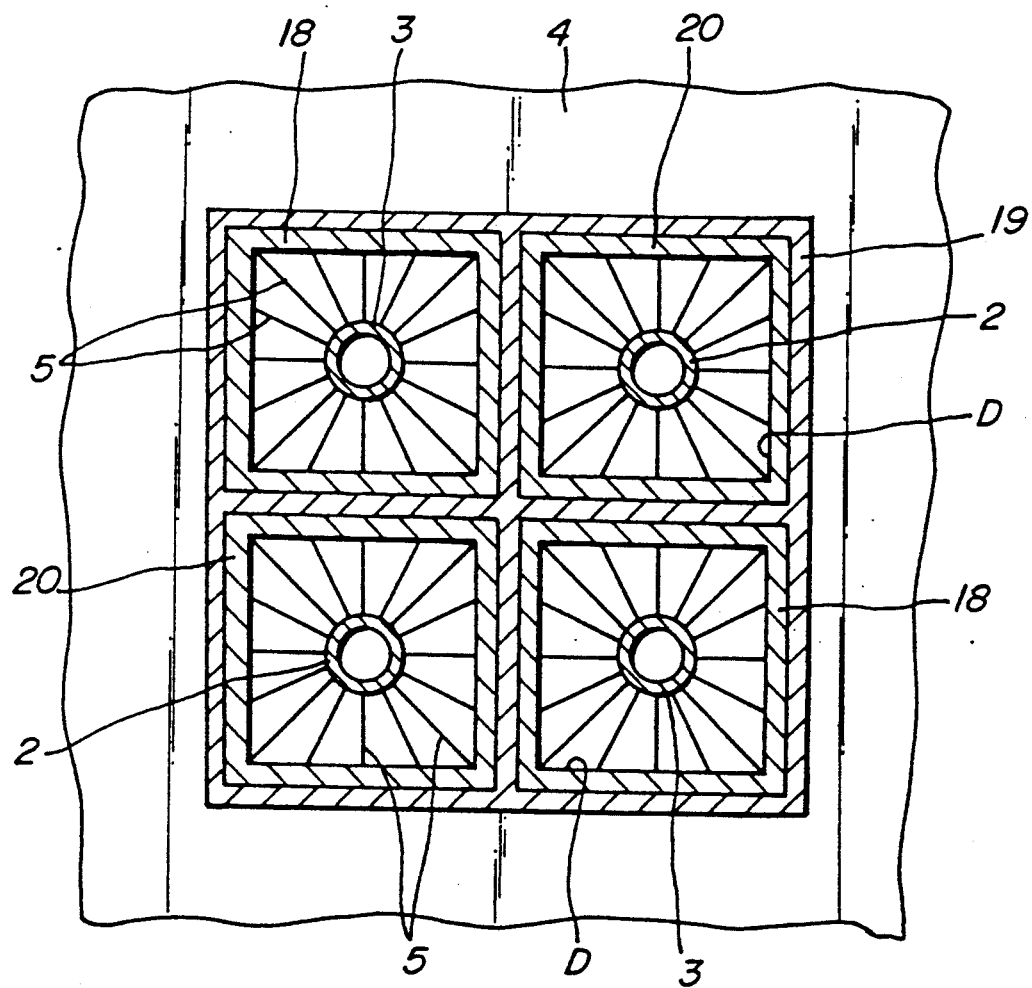
FIG. 6 is a sectional view taken along the line VI—VI of FIG. 5.

FIG. 5 is a perspective view, partly broken, showing one embodiment by applying the invention to a honeycomb shaped SOFC, and FIG. 6 is a perspective view taken along the line VI—VI of FIG. 5. In the present embodiment, like numerals are designated to the like functional members of the generator shown in FIG. 1.

In the present embodiment, a solid electrolyte partition 19 is formed into the so-called honeycomb shape of a square in cross section (for the sake of explanation, unit tubes are shown in two columns and two rows, but numbers of the unit tube may optionally be changed).

The solid electrolyte partition 19 forms a rectangular parallelopiped space (hole) in two columns and two rows, the inner peripheral surface of which are alternately provided fuel electrodes 18 and air electrodes 20 in checkered fashion. The conductive fuel gas supply tube 3 is passed through a hole D in case of forming a fuel electrode 18, and the conductive oxidizing gas supply tube 2 is passed through the hole D in case of providing an air electrode 20. One end of the needle-like current collector 5 is urgedly contacted with all over the electrode surface of the fuel electrode 18 or the air electrode 20, and the other end of the needle-like current collector 5 is fixed to the conductive fuel gas supply tube 3 or the conductive oxidizing gas supply tube.

The other construction is substantially the same as the generator shown in FIG. 1, and the fuel electrode 18 is electrically connected to the conductive fuel gas supply tube 3 and the air electrode 20 to the conductive oxidizing gas supply tube 18 by the needle-like current collector 5 to collect current. Moreover, the oxidizing gas or fuel gas is discharged from an oxidizing gas outlet 2a or a fuel gas outlet 3a and then divided into two directions in each hole D as shown by an arrow A' or B' to flow into the combustion product chamber 7 from parts opened in each hole D, where the oxidizing gas and the fuel gas are mixed and the fuel gas is burnt.

The present embodiment can perform the above-described effects (1)-(5), and additionally, since the solid electrolyte partition 19 is a honeycomb structure, the structure is stronger than that of FIG. 1, so that even if the thickness of the solid electrolyte partition is made thinner than the prior one (such as less than 200 μm), practical strength can be obtained. Further, the partition area per unit volume is large.

Moreover, the SOFC per se with the use of a honeycomb solid electrolyte partition has been known, but in the known system, it is necessary to connect air electrodes and fuel electrodes one by one by lead wires, and to wire them to prevent short circuit on the way, which was troublesome. On the contrary, in the present embodiment, current is collected by the conductive gas supply tube 2 or 3, so that there is no troublesome wiring and no danger of short circuiting.

The above-described modifications (a)-(f) are also possible in the present embodiment. Moreover, the cross section of each unit tube can be formed into any optional polygon, such as triangle, square, hexagon and the like, and the partition may be corrugated. When each unit hole is formed into triangle, square or hexagon, such shape is preferable to increase the partition area and furthermore electrode case is easily available and the hexagonal hole is easy to manufacture.

Figure 7:
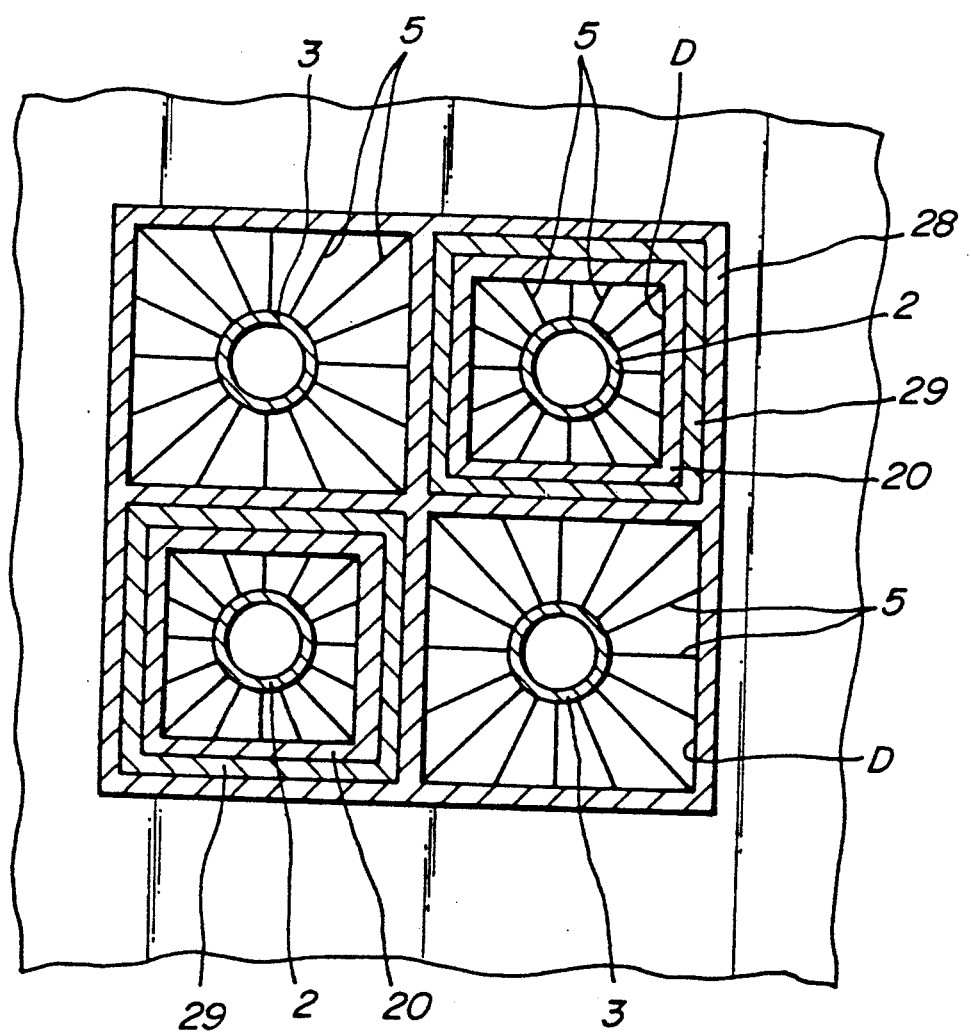
FIG. 7 is a sectional view similar to FIG. 6 showing a further embodiment of the fuel cell generator.

FIG. 7 is a cross-sectional view showing another fuel cell generator in the same manner as in FIG. 6.

In the present embodiment, the fuel electrode 28 is a honeycomb structure body. In unit tubes on upper left and lower right in FIG. 7 are exposed fuel electrodes 28 to the inner peripheral surface, the conductive fuel gas supply tube 3 is inserted into the hole, the free end of the needle-like current collector 5 is urgedly contacted with the whole electrode surface of the fuel electrode 28, and the other end of the needle-like current collector 5 is fixed to the outer peripheral surface of the conductive fuel gas supply tube 3. In the drawing, moreover, in the unit tubes on upper right and lower left, the solid electrolyte film 29 is applied on the inner peripheral surface of the fuel electrode 28, and the air electrode 20 is applied on the inner peripheral surface. Moreover, the conductive oxidizing gas supply tube 2 is inserted into the hole D, the needle-like current collector 5 is urgedly contacted with the whole electrode surface of the air electrode 20, and the other end of the needle-like current collector 5 is fixed to the outer peripheral surface of the conductive oxidizing gas supply tube 3. The other construction is the same as the fuel cell generator shown in FIGS. 5 and 6, and the same effect can be performed. Moreover, since the solid electrolyte film 29 is applied on the inner wall of the fuel electrode 28 of a honeycomb structure, the solid electrolyte film 29 does not require any strength as a structural member, and a thinner solid electrolyte film (such as about 50 μm) than the case of FIG. 5 can be manufactured. By making the solid electrolyte for passing oxygen ions therethrough thin, a passing distance of oxygen ions is made short, and efficiency of electricity generation can be more improved.

In the embodiment of FIG. 7, it can be possible to exchange the fuel electrode and the air electrode to form the air electrode of a honeycomb structure, and to form a solid electrolyte film and a fuel electrode film on the inner peripheral surface of the air electrode. In this case, in FIG. 7 for example, the air electrodes are exposed in the holes and the conductive oxidizing gas supply tubes are passed through holes in upper left and lower right unit tubes, while the fuel electrodes are exposed in the holes and the conductive fuel gas supply tubes are passed through the holes in upper right and lower left unit tubes.

According to the fuel cell generator of the first aspect of the present invention, multipoint contact current collectors contact with substantially the whole electrode surface of the fuel electrode and the air electrode, so that electricity can directly be taken out of substantially the whole surface of the fuel electrode and the air electrode, and as a result, it is possible to prevent output resistance loss caused by flowing current in the fuel electrode and the air electrode, and to increase efficiency of electricity generation.

Moreover, since the fuel gas supply tube or oxidizing gas supply tube arranged in the inner space of the tubular solid electrolyte partition is conductive and electrical connection to the fuel electrode or air electrode is made by the multipoint contact current collector, current can directly be collected from the fuel electrode or air electrode faced to the inner space through supply tubes, without requiring any interconnector faced to the outer peripheral surface of the cell unit.

According to the fuel cell generator of the second aspect of the present invention, multipoint contact current collectors contact with substantially the whole electrode surface of the fuel electrode or air electrode exposed in each hole of the fuel cell of a honeycomb structural body, so that electricity can directly be taken out of substantially the whole surfaces of the fuel electrode and the air electrode, so as to prevent output resistance loss caused by flowing current in the fuel electrode and the air electrode, and to increase efficiency of electricity generation.

Moreover, the fuel gas supply tube or oxidizing gas supply tube arranged in each hole is conductive, and electrical connection with the fuel electrode or air electrode exposed in each hole is made by the multipoint contact collector, so that there is required no troublesome wiring between air electrodes and between fuel electrodes as before, and operation of the system is stable, and there is no danger of short circuiting.

What is claimed is:

1. A fuel cell generator comprising a plurality of tubular fuel cell units each at least including a tubular solid electrolyte partition having ion conductivity, a fuel electrode provided on one of an inner or outer peripheral surface of the tubular solid electrolyte partition, an air electrode provided on the other one of an inner or outer peripheral surface of the tubular solid electrolyte partition, a conductive fuel gas supply tube, a conductive oxidizing gas supply tube, at least one of these tubes being arranged in an inner space of the tubular solid electrolyte partition, and multipoint contact current collectors in contact with electrode surfaces of the fuel electrode and the air electrode substantially over the entire surface thereof, respectively, said multipoint contact current collectors electrically connecting the conductive fuel gas supply tube and the fuel electrode or the conductive oxidized gas supply tube and the air electrode.

2. The fuel cell generator of claim 1, wherein electric connection is made by the multipoint contact current collectors in the inner space.

3. The fuel cell generator claimed of claim 1, wherein the multiple contact current collectors are elastic and urgedly contacted with the whole surface of the air electrode and the fuel electrode.

4. The fuel cell generator of claim 1, wherein the tubular fuel cell unit is open at both ends and a number of cell units are linearly aligned.

5. The fuel cell generator of claim 1, wherein the tubular fuel cell unit is closed at one end.

6. The fuel cell generator of claim 1, wherein the conductive oxidizing gas supply tube is inserted in the inner space and electrically connected to the air electrode through the multipoint contact current collectors.

7. The fuel cell generator of claim 1, wherein the cell unit is made of ceramics.

8. The fuel cell generator of claim 1, wherein the conductive gas supply tube is made of heat resistant metal.

9. The fuel cell generator of claim 1, wherein the multipoint contact current collector is a brush bristle or needle-like current collector.

10. The fuel cell generator of claim 1, wherein the multipoint contact current collector is Ni felt.

11. A fuel cell generator comprising a fuel cell formed of a honeycomb structural body at least having a solid electrolyte partition having ion conductivity, a fuel electrode provided on one side of the solid electrolyte partition, an air electrode provided on the other side of the solid electrolyte partition, the fuel electrode or the air electrode being exposed in each hole of the honeycomb structural body, conductive fuel gas supply tubes and conductive oxidized gas supply tubes arranged in the holes, respectively, and multipoint contact current collectors in contact with electrode surfaces of the fuel electrode or the air electrode exposed in said holes substantially over the entire surface thereof, said multipoint contact current collectors electrically connecting the conductive fuel gas supply tube and the fuel electrode or the conductive oxidized gas supply tube and the air electrode.

12. The fuel cell generator of claim 11, wherein the solid electrolyte partition is formed of rectangular parallelopiped cells of the honeycomb structural body.

13. The fuel cell generator of claim 11, wherein the fuel electrode is made of honeycomb structural body.

14. The fuel cell generator of claim 11, wherein the electric connection is made by the multipoint contact current collectors in an inner space of the holes.

15. The fuel cell generator of claim 11, wherein a conductive oxidizing gas supply tube is inserted in an inner space of each hole and is electrically connected to the air electrode through the multipoint contact current collectors.

16. The fuel cell generator of claim 11, wherein said multiple contact current collectors ar elastic and urgedly contacted with the entire surfaces of the air electrode and the fuel electrode.

17. The fuel cell generator of claim 11, wherein the conductive ga supply tube is made of heat resistant metal.

18. The fuel cell generator of claim 11, wherein each multipoint contact current collector is a brush bristle or needle-like current collector.

* * * * *